June 22, 1937.   L. E. LA BRIE ET AL   2,084,401
BRAKE
Original Filed Sept. 11, 1929

INVENTOR.
LUDGER E. LA BRIE
BY   ADOLPH ROSNER
ATTORNEY.

Patented June 22, 1937

2,084,401

UNITED STATES PATENT OFFICE 2,084,401

BRAKE

Ludger E. La Brie, Detroit, Mich., and Adolph Rosner, Rockton, Ill., assignors to Bendix Brake Company, South Bend, Ind., a corporation of Illinois Original application September 11, 1929, Serial No. 391,714, now Patent No. 2,044,988 dated June 23, 1936. Divided and this application November 7, 1935, Serial No. 48,638

7 Claims. (Cl. 188—78)

This invention relates to brakes, and is illustrated as embodied in an internal expanding automobile brake having novel means for positioning the brake friction means.

An object of the invention is to provide simple and inexpensive positioning means for the brake band or shoe, of a type which will not interfere with the brake-applying movement thereof.

Preferably the band or shoe is positioned by means such as a roller interengaged with a slot formed in the band itself.

In one arrangement the band has spaced lugs depressed to form a slot embracing the roller and to leave between the lugs a strip supporting the center of the lining and engaging the outer edge of the roller when the brake is released.

In another arrangement the roller is carried by a support which also carries two smaller rollers, one on each side of the first roller, which are engaged at their edges by the inner face of the band when the brake is released.

Preferably the support is adjustable, for example by forming it eccentrically of a shaft which can be adjusted from outside the brake, to shift the roller or rollers radially of the brake.

The above and other objects and features of the invention, including various novel combinations and desirable particular constructions, will be apparent from the following description of the illustrative embodiment shown in the accompanying drawing, in which.

Figure 1:
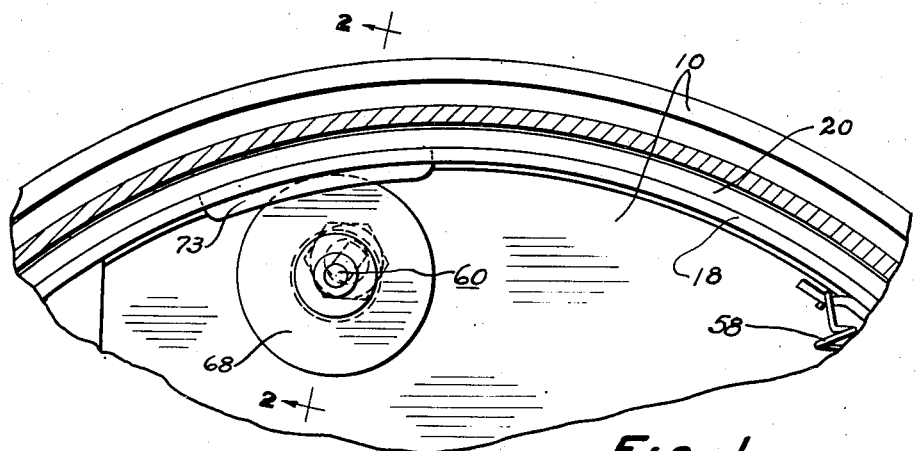
Figure 1 is a partial section vertically through a brake, just inside the head of the brake drum, showing part of the friction means in side elevation.

In the illustrated embodiments the brake includes a support such as a backing plate 10, arranged at the open side of a rotatable drum 12, within which is arranged the brake friction means, illustrated as a steel band 18 faced with brake lining 20.

The applying means, anchorage, etc. of the brake may be as fully described in my application No. 391,714, filed September 11, 1929, of which the present application is a division.

The present invention relates to positioning means indicated generally at 60, and shown as including a roller 68 rotatably mounted on an eccentric portion of a shaft 70 adjustably clamped to the backing plate 10. By turning the shaft 70 the roller 68 may be shifted radially of the brake to adjust its position.

The peripheral portion of the roller 68 is embraced between lugs or guiding portions 73 depressed from the level of the band 18, and spaced apart to form a slot for the roller 68. The outer edge of the roller 68 is engaged, when the brake is released, by a strip 72 of the band 18, left undepressed between the guiding portions 73, and which also serves to support the center of the lining 20.

Figures 2, 3:
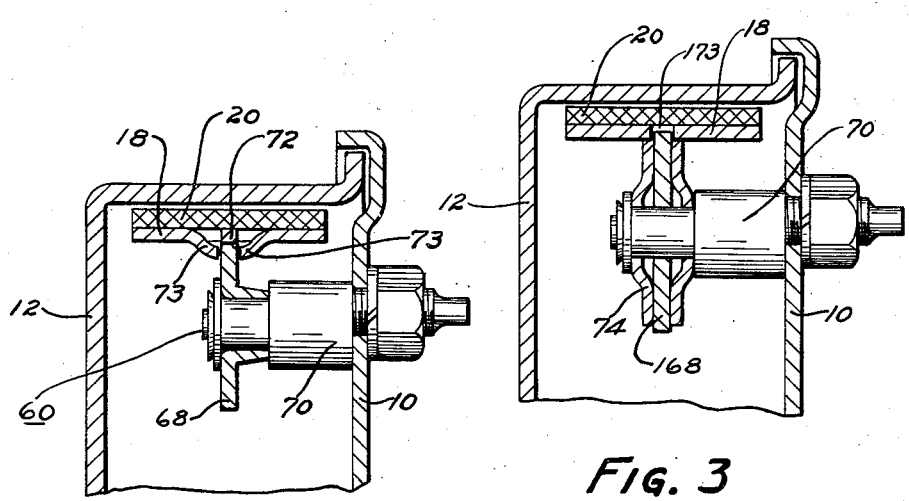
Figure 2 is a partial radial section on the line 2—2 of Figure 1.
Figure 3 is a partial section corresponding to Figure 2, but showing a modification.

In the arrangement of Figure 3, a roller 168 mounted on the eccentric portion of the shaft 70 projects into and is embraced by a slot 173 in the band 18. The slot 173 is bridged and covered, on the outer side of the band, by the lining 20.

The eccentric portion of the shaft 70 also carries, arranged one on each side of the central roller 168, two smaller rollers 74, the outer edges of which are engaged, when the brake is released, by the inner face of the band 18.

While two illustrative embodiments have been described in detail, it is not our intention to limit the scope of our invention to those particular embodiments, or otherwise than by the terms of the appended claims.

We claim:

1. A brake structure comprising, in combination, an annular expansible friction device and stop means for determining the inoperative position of said device comprising an eccentrically mounted roller member extending in a plane parallel to said brake and contacting in its periphery the relatively narrow portion of the rim defined by outwardly striking portions of the rim of said friction member, said latter portions contacting the side faces of said roller serving as guides thereof.

2. A brake comprising, in combination, an internally expansible friction device having a rim member provided with a groove on its inner surface, together with stop means for determining the inoperative position of said band, said means comprising three eccentrically mounted juxtaposed disks, the intermediate disk fitting within the aforementioned groove.

3. A brake comprising an expansible friction device having a band-like portion faced with lining and formed with a slot covered by said lining, and positioning means therefor comprising a support carrying a central roller projecting into said slot, and also carrying smaller rollers on opposite sides of said central roller and arranged to be engaged at their outer edges by the inner face of said device when the brake is released.

4. A brake comprising an expansible friction device having a band-like portion faced with lining and formed with a slot covered by said lining, and positioning means therefor comprising a support carrying a central roller projecting into said slot, and also carrying smaller rollers on opposite sides of said central roller and arranged to be engaged at their outer edges by the inner face of said device when the brake is released, said support being adjustable to shift the rollers radially of the brake.

5. A brake comprising a friction element having a band part faced with lining and having two portions spaced laterally of the brake and depressed from the level of the band part to form lugs facing toward each other to define a slot aligned with an undepressed strip of said band part between said lugs, said lining being centrally supported by said strip.

6. A brake comprising a friction element having a band part formed with two portions spaced laterally of the brake and depressed from the level of the band part to form lugs facing toward each other to define a slot aligned with an undepressed strip of said band part between said lugs.

7. A brake comprising, in combination with a drum and a backing plate at the open side of the drum, a band within the drum and faced with lining engageable with the drum, said band having a slot therethrough across which the lining extends, a shaft having an enlarged portion engaging the backing plate and clamped thereto and having a reduced-section eccentric portion extending inside of the part of the band formed with said slot, and a roller journaled on said eccentric portion of the shaft and projecting into said slot at its margin.

LUDGER E. LA BRIE.
ADOLPH ROSNER.